No. 607,527. Patented July 19, 1898.
G. H. F. SCHRADER.
TIRE OR OTHER VALVE.
(Application filed Sept. 28, 1896.)
(No Model.)
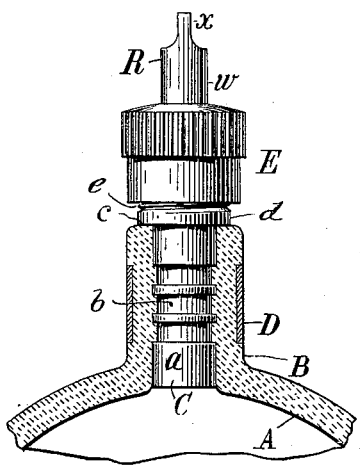
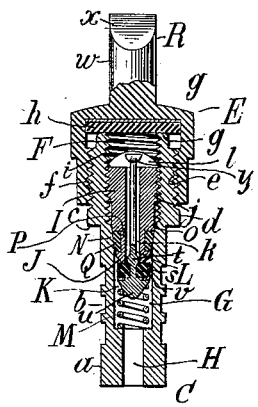
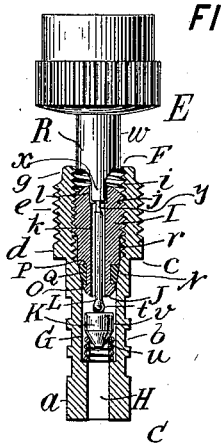
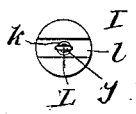
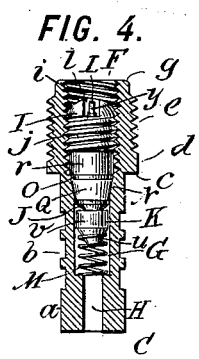
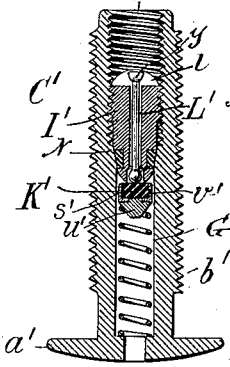
WITNESSES:
Fred White
Thomas F. Wallace
INVENTOR:
George H. F. Schrader,
By his Attorneys,

UNITED STATES PATENT OFFICE.

GEORGE H. F. SCHRADER, OF NEW YORK, N. Y.

TIRE OR OTHER VALVE.

SPECIFICATION forming part of Letters Patent No. 607,527, dated July 19, 1898.

Application filed September 28, 1896. Serial No. 607,167. (No model.)

*To all whom it may concern:*

Be it known that I, GEORGE H. F. SCHRADER, a citizen of the United States, residing in the city, county, and State of New York, have invented certain new and useful Improvements in Tire or other Valves, of which the following is a specification.

This invention relates to pneumatic and other valves, and aims to provide certain improvements especially applicable to pneumatic-tire valves and the like.

Tire-valves are now constructed with a small body adapted to be clamped in the end of the cot of a tire by compressing the cot against the grooved body by means of a winding of wire or a compressed ferrule, or they are adapted to be fastened by clamping the tire between a shoe on the end of the valve-shell and a nut screwing on the exterior of the latter. In order to avoid disconnecting the valve-shell when it is necessary to remove or repair the inclosed working parts of the valve, it is advantageous to close the valve-chamber by a plug separably coupled within the outer end of the shell. Such a construction is shown in my application for Letters Patent filed June 4, 1896, Serial No. 594,263.

My present invention relates especially to valves having a removable plug and aims to provide various improvements in such valves, reducing their size, simplifying their construction, and improving the arrangement and operation of the parts.

To this end in carrying out the preferred form of my improvements I provide an improved construction of shell having an inner valve-chamber, an outer screw-threaded socket, and an intermediate tapering wall, the socket being of relatively large diameter, the chamber of relatively small diameter, and the tapering wall extending from the larger to the smaller diameter, and I provide a tubular plug having a valve-seat on its inner end within said chamber, an enlarged screw-threaded outer end screwing in said socket, an annular groove between said seat and end and opposite said tapering wall, and a suitable packing medium of relatively soft material in said groove fitting against said wall when the plug is screwed home and thereby making a tight joint, and preferably also I provide a valve and valve-stem inseparably coupled to the plug and freely movable relatively thereto, the stem projecting into the path which must be followed by a screw-driver applied to remove the plug.

In the accompanying drawings, which illustrate certain adaptations of my invention, Figure 1 is a side elevation of a tire-valve applied to the cot of a tire, the cot being shown in section, showing the preferred form of my invention. Fig. 2 is an axial section of the shell, cap, and valve mechanism, the parts being in the closed position. Fig. 3 is a similar section taken at right angles, the cap being inverted and the valve in the open position. Fig. 4 is an axial section of the shell, showing the plug and valve in elevation and in the closed position. Fig. 5 is an axial section of the shell alone. Fig. 6 is a top view of the plug alone. Fig. 7 is a bottom view thereof. Fig. 8 is a side elevation of the plug alone. Fig. 9 is an axial section of the ring of soft or packing material. Fig. 10 is an axial section of a shoe-valve provided with my improvements and its plug and valve, the parts being shown in the closed position; and Fig. 11 is an axial section of the shell alone.

The construction shown in Figs. 1 to 9, inclusive, comprises the preferred form of my invention, which will first be described in detail. In these figures, A indicates the tire; B, its cot; C, the valve-shell; D, the usual ferrule clamping the cot against the shell, and E the cap screwing on the latter. The shell C has a slender cylindrical tire end $a$, having annular grooves $b$ opposite the ferrule D and terminating in an abrupt shoulder $c$, from which the shell extends outwardly as a cylindrical head $d$, having an external screw-thread $e$, which is engaged by the internal screw-thread $f$ of the cap E. The head ends in a smooth convex annular lip $g$, against which the packing-washer $h$ of the cap bears. Internally the shell has an outer socket F, having an internal screw-thread $i$ and an inner chamber G, from which a contracted outlet H leads through the shell. Within the socket is separably located a plug I, which has an external screw-thread $j$ engaging the thread $i$, having on its inner end an annular valve-seat J within the chamber G, traversed by an inlet-duct $k$, extending from this seat to the outer end of the plug and having a screw-driver notch $l$ at its outer end. The plug closes the outer end of the valve-chamber and retains therein a valve proper, K, which may have a stem L fixed to it and may move toward its seat by a spring M, if desired.

According to my invention the socket F is of relatively large diameter, the chamber G is of relatively small diameter, and a smooth annular intermediate wall N, preferably tapering or conical, is formed leading from the diameter of the socket inwardly to the diameter of the chamber, and the plug I is of equal diameter to the socket at its outer end, of not greater diameter than the chamber at its inner or seat end, and has an annular intermediate wall O between these ends, preferably tapering or conical and provided with an annular groove P, in which is carried an annular washer Q of relatively soft material, as soft metal or packing material, which has an outer face fitting against the wall N of the shell and making a leak-tight joint between the plug and shell when the plug is screwed home. Preferably above and below the groove P the plug has tapering faces $n$ subtantially coinciding with the taper of the face N of the shell, and intermediate of these faces the ring Q has a tapering outer face $m$ coinciding with the adjacent face of such wall. The groove P may be of any shape in cross-section; but I prefer to make it with a cylindrical inner wall $p$ and right-angle top and bottom shoulders $q$. The seat J begins at the end of the lower wall $n$ of the plug and extends inwardly to the duct $k$ thereof. Between the screw-thread $j$ and the upper wall $n$ of the plug I prefer to form it with a cylindrical portion $r$, which serves as a guide while entering the screw-thread $i$ and affords room for advancement of the plug until it is seated.

In seating the plug forces the ring Q against the wall N with great pressure, thus making an absolutely tight joint between the plug and shell at the outer end of the valve-chamber.

The valve proper may be of any suitable construction, that shown being preferred, and consisting of a packing-ring $s$, surrounding the stem L, prevented from rising thereon by a shoulder $t$, seating at its lower side on a head $u$ and surrounded by a flange $v$.

According to another feature of improvement I leave the outer end of the plug exposed within the socket F and free to receive a screw-driver for manipulating it, and I provide a connection between the valve and this exposed end by which the valve must be opened during the movement of the screw-driver into the notch $l$. For screwing the plug I may use the common screw-driver R, which consists of a cylindrical projection $w$, having a flattened working end $x$, the projection snugly fitting in the socket F when the cap is unscrewed and inverted and then entering the notch for engaging the plug and simultaneously striking the outer end of the valve-stem and moving the valve inward, thus causing deflation during manipulation of the plug. This deflation prevents blowing out of the valve and plug as the latter is unscrewed.

According to another feature of improvement I inseparably and irremovably connect the valve and plug together, so that in case of removal there is no danger of the parts being separated or lost, and the valve can be advantageously withdrawn during the withdrawal of the plug. This I prefer to accomplish by spreading the head $y$ of the stem L until it exceeds the diameter of the duct $k$ through the plug, making the length of the stem sufficient to leave a loose movable connection between the valve and its stem and the plug, so that the valve can move inwardly sufficient for purposes of operation, but still cannot be separated entirely from the plug. This connection can be made in any suitable way; but the way shown is a simple and convenient one and can be made by simply squeezing the end of the stem between a pair of pincers after the valve has been applied to the plug. The projection of the stem into the notch $l$ insures its being struck by the end of the screw-driver as the latter enters the notch and places it within easy reach of any tool when deflation of the valve is desired.

In use the cap will ordinarily be screwed upon the shell, as shown in Fig. 1. For pumping up the tire the cap will be removed and a pump coupled to the shell, the inrushing air unseating the valve so long as the outer pressure exceeds that within the tire. When inflated, the cap will be applied to protect the valve. For deflation the cap will be removed, inverted, and its end inserted against the valve-stem. To adjust the plug, the cap or any other tool may be used to set up the plug until the desired joint is obtained. Should any imperfection occur in the valve, the user can immediately remove the plug and the valve and clean the interior of the chamber, to which he has full access, and which can be readily operated upon by reason of its small diameter as compared with the socket F and the tapering wall N. The valve parts can be cleaned or renewed and the plug returned to place.

It will be seen that my invention provides improvements which can be readily and advantageously availed of, and it will be understood that the invention is not limited to the exact details of construction and arrangement nor to the particular character of valve shown as embodying the preferred form of the invention, but that it can be employed according to such modifications as circumstances or the judgment of those skilled in the art may dictate without departing from the spirit of the invention.

The modification shown in Figs. 10 and 11 is similar to that described, except that the shell C' has a shoe $a'$ on its lower end and an external screw-thread $b'$ on its body, and the valve K' is not inseparably connected to the plug I', but is made with a separate deflater L', which itself is inseparably connected to said plug. An imperforate disk $s'$, held on the head $u'$ by a flange $v'$, here constitutes the valve K'.

What I claim is, in tire and other valves, the following-defined novel features and combinations, substantially as and for the purpose hereinbefore set forth, namely:

1. In valves, a shell member having a relatively small inner valve-chamber, a larger outer screw-threaded socket, an outer end through which said socket opens, and an annular wall between said chamber and socket, in combination with a tubular plug entering said shell through its outer end having a valve-seat within said chamber, an external screw-thread screwing into said socket, and an annular groove surrounding its exterior between said seat and its screw-thread, a ring of relatively soft material in said groove outwardly of and exposing said seat and compressed between said plug and wall for making a tight joint between them, and a valve proper in said chamber engaging said seat.

2. In valves, a shell member having a relatively small valve-chamber, a relatively large internal screw-threaded socket, and an intermediate tapering wall formed of a single integral piece of metal, in combination with a plug having a large external screw-threaded outer end screwing in said socket from the outer end of said shell, having on its inner end an exposed annular seat within said valve-chamber, and a tapering wall between said thread and seat fitting the tapering wall of the shell when the plug is screwed home in said socket and making a tight joint therewith, and a valve proper in said chamber seating directly on said plug.

3. In valves, a shell having a valve-chamber, a screw-threaded socket leading inwardly from its outer end, and an annular seating-face between said chamber and socket, in combination with a tubular plug removably held in said shell, and having an external screw-thread engaging the thread thereof, a valve-seat in said chamber and an annular ring of packing material connected to and removable with the plug and forced by the plug against said face of said shell when the plug is screwed home in the latter, and making a leak-tight joint around said seat, said plug having provisions for receiving a screw-driver at its upper end, and a valve proper in said chamber.

4. In valves, a shell having a valve-chamber, an internal screw-threaded socket, and a seating-face between said chamber and socket, in combination with a removable plug entering within the outer end of said shell having an external screw-thread screwing into said socket, a valve-seat held in said chamber by said plug, an annular ring of packing material surrounding said plug connected to and removable with the plug and forced by it against said face of the shell and making a tight joint around said seat, said plug having an inlet-conduit, and at its outer end adapted to be engaged by a screw-driver, and a valve proper in said chamber engaging said seat.

5. In valves, a shell having a valve-chamber and internal threaded socket, in combination with a tubular plug I having a screw-thread screwing into said socket from the outer end of said shell, having a valve-seat in said chamber, and an annular groove P between said thread and seat, and a ring of packing material independent of said seat in said groove and compressed between the latter and said shell when the plug is screwed home therein, and a valve proper in said chamber engaging said seat and held therein by said plug.

6. In valves, a shell having a valve-chamber and screw-threaded socket, in combination with a tubular plug I having a seat J in said chamber, an outer screw-thread engaging that of said socket, a tapering face $n$ between said seat and thread, and a groove P in said face, a packing material in said groove inclosed within said shell, outwardly of and exposing said seat, and compressed by said plug against said shell, and a valve proper held in said chamber by said plug and engaging said seat.

7. In tire and like valves, a shell member having an internal chamber, and a screw-threaded socket in its outer end leading to said chamber, in combination with a tubular plug having a relatively small inner end passing into said chamber, a relatively larger outer end having an external screw-thread and screwing entirely within said socket, an outer annular groove between said ends, a valve-seat, and an inlet-duct leading thereto, a valve proper engaging said seat, and a packing-washer in said groove confined between the latter and the interior of said shell.

8. For tire-valves and the like, a seat member consisting of a tubular plug having a relatively small inner end, a relatively large screw-threaded outer end, an external groove surrounding it between said ends, a valve-seat, and an inlet-duct leading to said seat, said member adapted to pass entirely within the outer end of a valve-shell and make a leak-tight joint therein.

9. For tire and other valves, a seat member consisting of a tubular plug having an inner end, an externally-screw-threaded outer end, an annular groove surrounding it between said ends, a valve-seat, and an inlet-duct leading through it to said seat, and a valve-stem movably coupled to said member, said member and valve-stem adapted to pass entirely within the socket of a valve-shell.

10. For tire and other valves, a seat member consisting of a tubular plug having an inner end, an externally-screw-threaded outer end, an external groove surrounding it between said ends, a valve-seat, an inlet-duct extending through it to said seat, said member adapted to screw entirely within the socket of a valve-shell, and a valve proper engaging said seat and movably coupled to said member.

In witness whereof I have hereunto signed my name in the presence of two subscribing witnesses.

GEO. H. F. SCHRADER.

Witnesses:
GEORGE H. FRASER,
THOMAS F. WALLACE.